(12) United States Patent
Kim et al.

(10) Patent No.: US 7,542,190 B2
(45) Date of Patent: Jun. 2, 2009

(54) TANDEM LASER SCANNING UNIT INCLUDES AN OPTICAL SCANNING LENS INCLUDES AT LEAST ONE SUB-SCANNING CROSS-SECTION HAVING AN ASPHERICAL SURFACE IN A SUB-SCANNING DIRECTION TO REDUCE A CURVATURE OF THE SCANNING LINE

(75) Inventors: Hyung-soo Kim, Suwon-si (KR); Woo-kyu Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/502,467

(22) Filed: Aug. 11, 2006

(65) Prior Publication Data

US 2007/0058231 A1    Mar. 15, 2007

(30) Foreign Application Priority Data

Sep. 15, 2005  (KR) ................... 10-2005-0086243

(51) Int. Cl.
*G02B 26/08*   (2006.01)

(52) U.S. Cl. ..................................... 359/207

(58) Field of Classification Search ......... 359/205–207, 359/356, 275; 347/244
See application file for complete search history.

(56) References Cited

U.S. PATENT DOCUMENTS 5,251,055 A * 10/1993 Koide .......................... 359/216

5,737,112 A *  4/1998  Iizuka ......................... 359/205
6,133,935 A * 10/2000  Fujibayashi et al. ......... 347/258
2004/0246535 A1 12/2004  Takizawa

FOREIGN PATENT DOCUMENTS

| JP | 02-023313 | 1/1990 |
|---|---|---|
| JP | 06-286226 | 10/1994 |
| JP | 10-282409 | 10/1998 |
| JP | 2001-142274 | 5/2001 |
| KR | 1020040065055 | 7/2004 |
| KR | 1020050003662 | 1/2005 |

* cited by examiner

*Primary Examiner*—Alessandro Amari
*Assistant Examiner*—Jennifer L. Doak
(74) *Attorney, Agent, or Firm*—Rolylance, Abrams, Berdo & Goodman, L.L.P.

(57) ABSTRACT

A tandem laser scanning unit (LSU) is provided. The tandem LSU includes a light source, a beam deflector, and an optical scanning lens. The beam deflector rotates on a light-emitting path of the light source to simultaneously deflect different light beams obliquely incident at a predetermined angle to each other within a sub-scanning plane substantially parallel to the rotational axis of the beam deflector. The optical scanning lens allows the light beams deflected by the beam deflector to be condensed on corresponding photosensitive drums. The optical scanning lens includes at least one sub-scanning cross-section having an aspherical surface to reduce the curvature of a scanning line. Using the tandem LSU, the distortion and curvature of the scanning line are corrected while providing an oblique incidence optical system having advantages in terms of manufacturing costs and driving efficiency.

25 Claims, 6 Drawing Sheets

TANDEM LASER SCANNING UNIT INCLUDES AN OPTICAL SCANNING LENS INCLUDES AT LEAST ONE SUB-SCANNING CROSS-SECTION HAVING AN ASPHERICAL SURFACE IN A SUB-SCANNING DIRECTION TO REDUCE A CURVATURE OF THE SCANNING LINE

CROSS-REFERENCE TO RELATED PATENT APPLICATION

This application claims the benefit under 35 U.S.C. § 119(a) of Korean Patent Application No. 10-2005-0086243, filed on Sep. 15, 2005, in the Korean Intellectual Property Office, the entire disclosure of which is hereby incorporated by reference.

BACKGROUND OF THE INVENTION

1. Field of the Invention

The present invention relates to a tandem laser scanning unit (LSU). More particularly, the present invention relates to a tandem LSU capable of realizing a multi-color image by simultaneously scanning light beams emitted from a plurality of light sources onto different photosensitive drums.

2. Description of the Related Art

A laser scanning unit (LSU) for apparatuses such as laser printers, digital copying machines, barcode readers, and facsimiles forms a latent image on an exposure surface using a main scanning operation performed by a beam deflector and a sub-scanning operation performed by rotating a photosensitive drum. In particular, to realize a multi-color image, a tandem image forming apparatus includes a plurality of exposure bodies that correspond to corresponding color components. An example of a tandem image forming apparatus is a color laser printer. A tandem image forming apparatus uses a tandem LSU simultaneously forming monochromatic light that corresponds to respective color components (for example, yellow, magenta, cyan, and black) on corresponding photosensitive drums, respectively.

The tandem LSU includes a beam deflector disposed on a light-emitting path of a light source and that deflects light beams. When the beam deflector is shared with respect to a plurality of light beams, the number of optical elements and the structure thereof may be simplified, so that an image forming apparatus including an LSU may be compactly made and the manufacturing cost thereof may be reduced. Considering such advantages, tandem LSUs having a structure in which a beam deflector is shared with respect to a plurality of light beams are actively being developed. To independently scan the plurality of light beams on a plurality of corresponding photosensitive drums, it is required to direct the plurality of light beams to a beam deflector rotating at high speed and to spacially separate the light beams after the light beams are deflected. For that purpose, different monochromatic light is incident to a rotating beam deflector in an oblique direction, so that the monochromatic light may be spacially separated (Japanese Patent Publication No. 2004-361627). However, in such an oblique incidence optical system, a straight scanning line is not formed on a photosensitive drum and the scanning line is distorted in a curved shape, such as a bow. Such distortion of the scanning line deteriorates image quality because the pitch between the scanning lines is not maintained uniformly. Particularly, in a color image forming apparatus realizing a color image by overlapping different monochromatic images, monochromatic images on a transfer belt do not coincide with each other, so that a desired color and image may not be formed.

Accordingly, a need exists for an improved tandem laser scanning unit to substantially eliminate distortion of a scanning line.

SUMMARY OF THE INVENTION

Exemplary embodiments of the present invention provide a tandem LSU that corrects the curvature of a scanning line while using an oblique incidence optical system having advantages in terms of manufacturing costs and driving efficiency.

According to an aspect of the exemplary embodiments of the present invention, a tandem LSU that forms a straight scanning line by scanning different light beams in a main scanning direction on different photosensitive drums. The tandem LSU includes a light source, a beam deflector rotating on a light-emitting path of a light source and simultaneously deflecting different light beams obliquely incident at a predetermined angle to each other within a sub-scanning plane substantially parallel to a rotational axis of the beam deflector, and an optical scanning lens allowing the light beams deflected by the beam deflector to be formed on corresponding photosensitive drums. The optical scanning lens includes at least one sub-scanning cross-section having an aspherical surface to substantially reduce a curvature of the scanning line.

The optical scanning lens may include a first scanning lens disposed at the beam deflector and a second scanning lens disposed at the photosensitive drum. A sub-scanning cross-section is disposed on at least one side of a light-incidence side of the first scanning lens and a light-emitting side of the first scanning lens has the aspherical surface.

According to another aspect of the exemplary embodiments of the present invention, a tandem LSU has a first optical system and a second optical system, each of which scans different light beams on different photosensitive drums. The tandem LSU includes a rotatable beam deflector shared by the first and second optical systems, having a first side facing the first optical system and a second side facing the second optical system. Light beams of the first and second optical systems are obliquely incident at a predetermined angle to each other within a sub-scanning plane substantially parallel to a rotational axis of the beam deflector. A first optical scanning lens and a second optical scanning lens allow light beams deflected by the beam deflector to be condensed on corresponding photosensitive drums. Each optical scanning lens includes at least one sub-scanning cross-section having an aspherical surface to substantially reduce a curvature of a scanning line.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings, in which.

Throughout the drawings, the same drawing reference numerals will be understood to refer to the same elements, features, and structures.

DETAILED DESCRIPTION OF EXEMPLARY EMBODIMENTS

Figure 1:
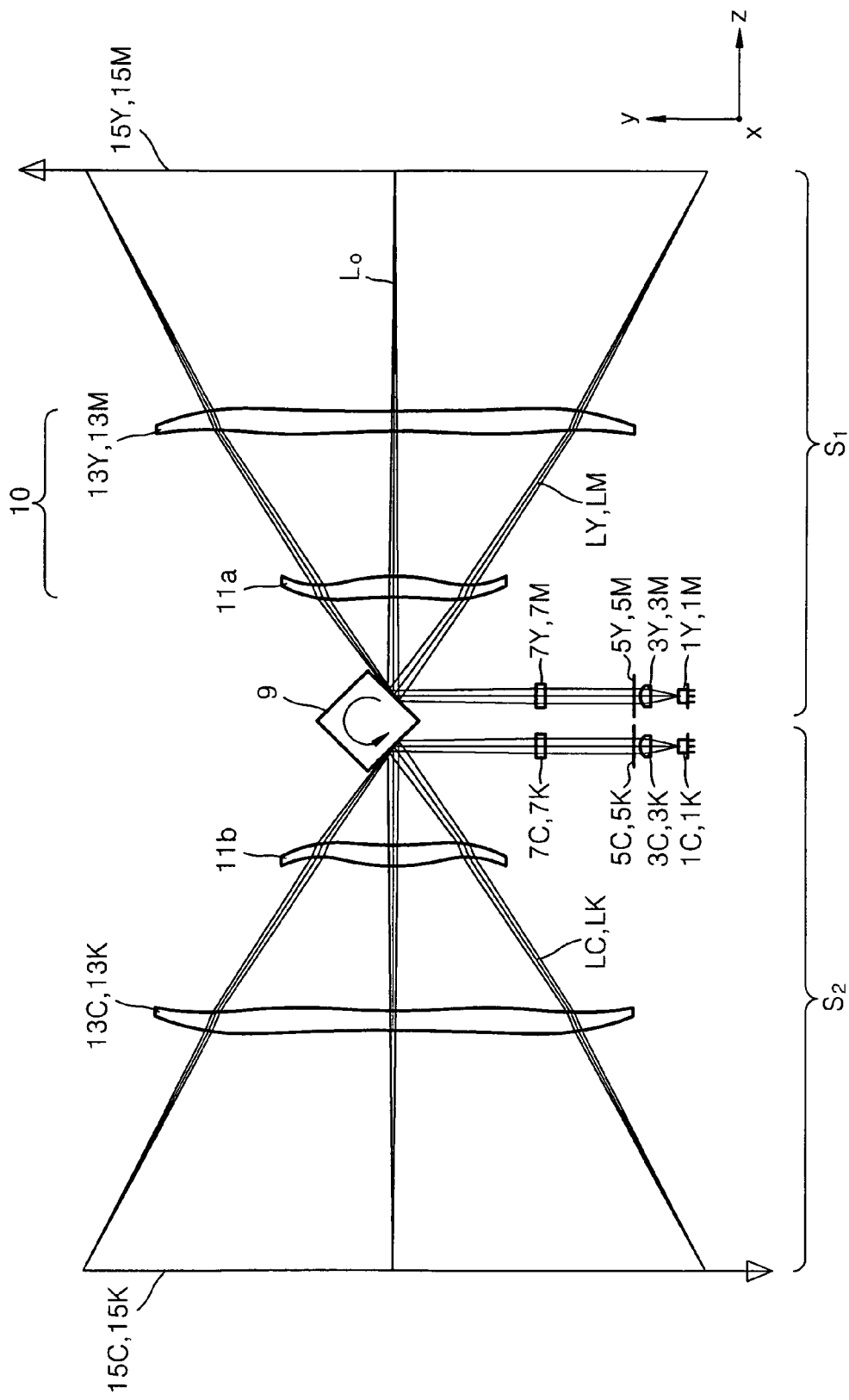
FIG. 1 is a view illustrating a main scanning cross-section of a tandem laser scanning unit (LSU) according to an exemplary embodiment of the present invention.
Figure 2:
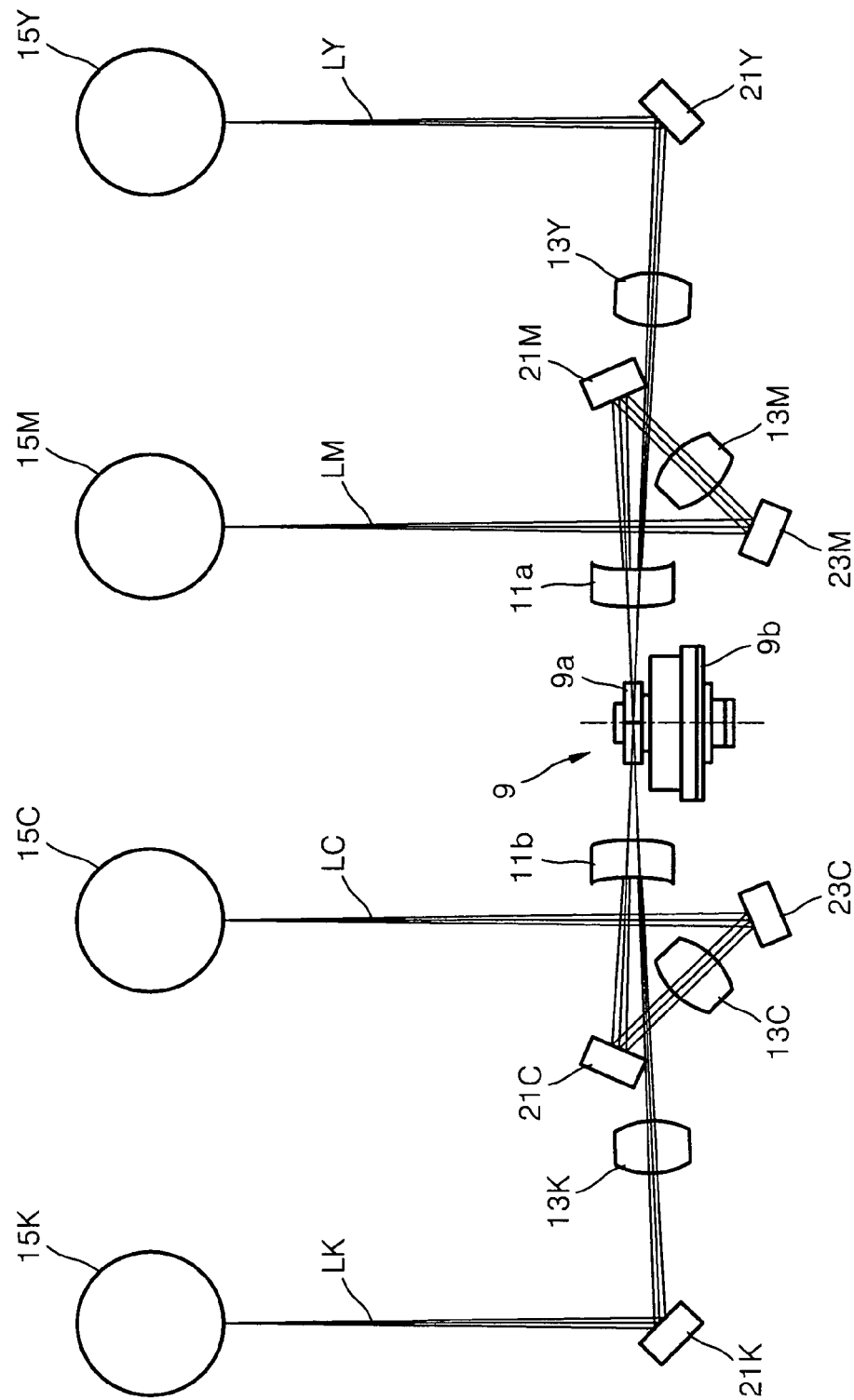
FIG. 2 is a view illustrating a sub-scanning cross-section of the LSU of FIG. 1 according to an exemplary embodiment of the present invention.

The present invention is described more fully with reference to the accompanying drawings (FIGS. 1-6), in which exemplary embodiments of the invention are shown. FIGS. 1 and 2 illustrate a tandem laser scanning unit (LSU) according to an exemplary embodiment of the present invention. FIG. 1 illustrates a main scanning cross-section of the LSU according to an exemplary embodiment of the present invention and FIG. 2 illustrates a sub-scanning cross-section of the LSU according to an exemplary embodiment of the present invention. A main scanning direction (y direction) indicates a direction in which a light beam is scanned on a photosensitive drum by a beam deflector. The main scanning direction corresponds to the direction of a scanning line of the photosensitive drum. A sub-scanning direction (x direction) corresponds to a rotational direction of the photosensitive drum.

Referring to FIG. 1, the tandem LSU includes first through fourth light sources 1Y, 1M, 1C, and 1K that correspond to respective color components of yellow, magenta, cyan, and black. Chromatic light emitted from light sources 1Y, 1M, 1C, and 1K is incident to a beam deflector 9 installed with respect to the light sources 1Y, 1M, 1C, and 1K. Light beams deflected by the beam deflector 9 are scanned onto first through fourth photosensitive drums 15Y, 15M, 15C, and 15K that correspond to the respective color components.

The tandem LSU includes a first image-forming optical scanning system S1 supplying scanning light for the first and second photosensitive drums 15Y and 15M, and a second image-forming optical scanning system S2 supplying scanning light for the third and fourth photosensitive drums 15C and 15K. The tandem LSU has a horizontally symmetric optical structure. The first image-forming optical scanning system S1 includes a pair of the first and second light sources 1Y and 1M, and has an optical structure for scanning light beams LY and LM from the first and second light sources 1Y and 1M onto the first and second photosensitive drums 15Y and 15M at a substantially constant speed. Similarly, the second image-forming optical scanning system S2 includes a pair of the third and fourth light sources 1C and 1K, and has an optical structure for scanning light beams LC and LK from the third and fourth light sources 1C and 1K onto the third and fourth photosensitive drums 15C and 15K at a substantially constant speed. The beam deflector 9 is arranged on a light-emitting path of the respective light sources 1Y, 1M, 1C, and 1K. Light beams emitted from the first and second light sources 1Y and 1M are incident to one side of the beam deflector 9, and simultaneously, light beams emitted from the third and fourth light sources 1C and 1K are incident to another side of the beam deflector 9. As described above, the beam deflector 9 is installed with respect to all of the light sources 1Y, 1M, 1C, and 1K, and the light beams LY, LM, LC, and LK emitted from different light sources are substantially simultaneously deflected and scanned onto the corresponding photosensitive drums 15Y, 15M, 15C, and 15K by the shared beam deflector 9. Referring to FIG. 2, the beam deflector 9 includes a driving motor 9b rotating at high speed and a polygonal mirror 9a coaxially mounted on a rotor of the driving motor 9b.

The polygonal mirror 9a may be formed in a polygonal structure whose outer periphery is divided into a plurality of deflective planes. A light beam incident to the polygonal mirror 9a is illuminated at a substantially constant speed along the main scanning direction by the deflective planes rotating at high speed.

Figure 3:
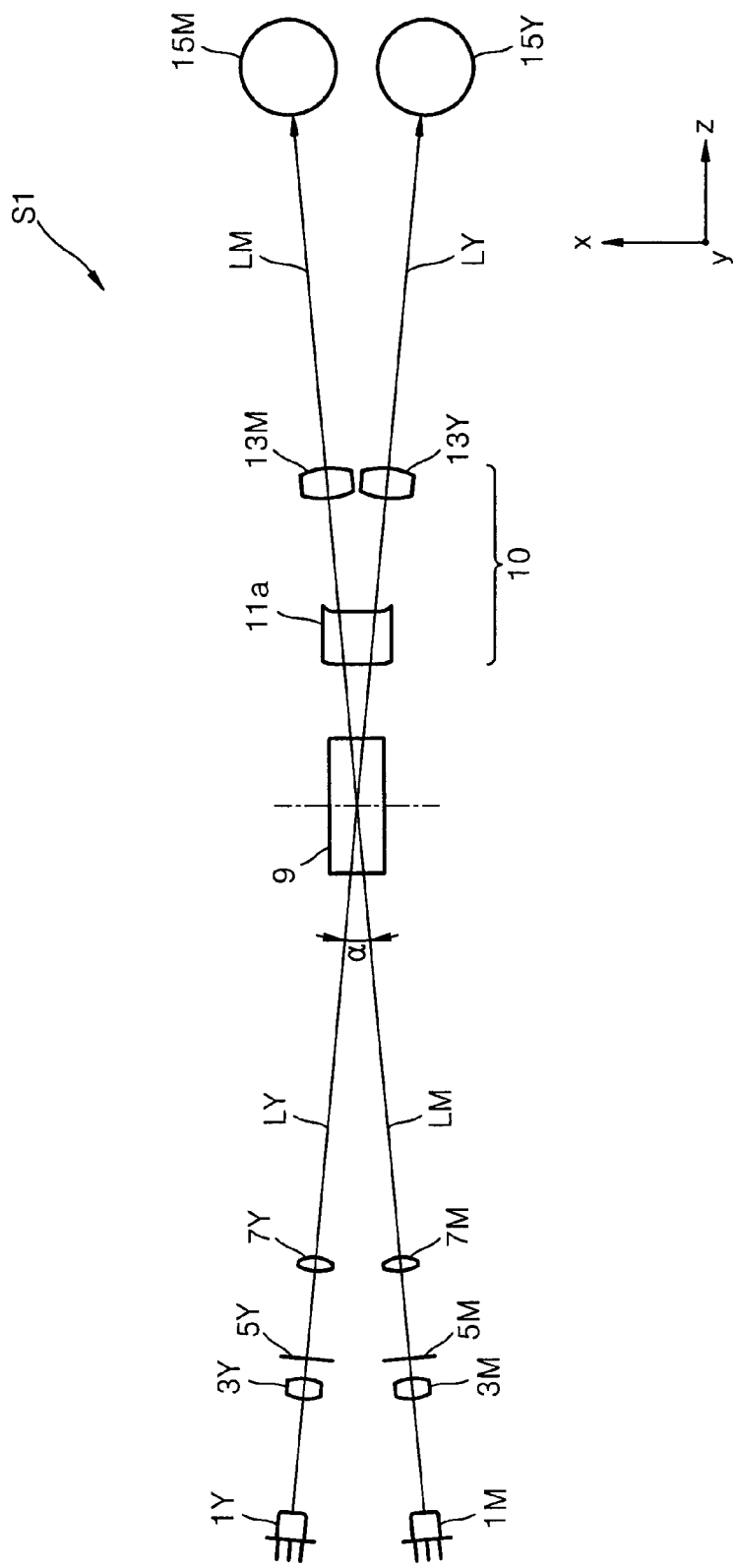
FIG. 3 is a view illustrating a sub-scanning cross-section of a first image-forming optical scanning system of FIG. 1 deployed along an optical path thereof according to an exemplary embodiment of the present invention.

FIG. 3 is a view of a sub-scanning cross-section of the LSU illustrating the optical arrangement of the first image-forming optical scanning system S1 deployed along an optical path thereof according to an exemplary embodiment of the present invention. The first and second light sources 1Y and 1M of the first image-forming optical scanning system S1 emit light beams LY and LM in an oblique direction within the cross-section of the sub scanning unit. The first and second light sources 1Y and 1M emit light beams LY and LM such that the angle between light beams LY and LM is a predetermined angle α such that light beams LY and LM converge as they approach the beam deflector 9. For that purpose, the first and second light sources 1Y and 1M spaced apart in the sub-scanning direction (x direction) may be tilted and mounted to have a predetermined inclination with respect to a horizontal axis. The first and second light sources 1Y and 1M emit different monochromatic light (for example, yellow and magenta light). To substantially simultaneously deflect the different monochromatic light LY and LM using the shared beam deflector 9, the respective light beams LY and LM should be separated after deflection, and then scanned onto the corresponding photosensitive drums 15Y and 15M. Therefore, for spatial separation, the light beams LY and LM are obliquely incident to the beam deflector 9. The first and second light sources 1Y and 1M may include a laser diode. Referring to FIG. 3, the first and second light sources 1Y and 1M may be packaged as a separate device, or the first and second light sources 1Y and 1M may be provided in a can-two beam type in which the light sources are packaged integrally in one device. Similarly, the third and fourth light sources 1C and 1K of the second image-forming optical scanning system S2 emit the light beams LC and LK at a predetermined angle between each other converging towards the beam deflector 9, and may be tilted and mounted to have a predetermined inclination with respect to a horizontal axis.

The light beams LY and LM incident to the beam deflector 9 are incident to one of the deflective planes at a predetermined angle α and converge towards the deflective plane of the light deflector 9. The light beams LY and LM intersect on the deflective plane, or get considerably close to each other. The beam-focusing positions of the light beams LY and LM are limited within a predetermined range, so that the size of an effective deflection plane of the beam deflector 9 may be reduced and thus costs required for manufacturing and driving the beam deflector 9 may be reduced. The light beams LY and LM deflected by the deflective plane are separated while progressing in diverging directions, and progress onto the corresponding photosensitive drums 15Y and 15M, respectively.

Collimating lenses 3Y and 3M, aperture plates 5Y and 5M, and cylindrical lenses 7Y and 7M may be sequentially arranged on an optical path between the respective light sources 1Y and 1M and the beam deflector 9. The light beams LY and LM diverge radially from the light sources 1Y and 1M and are changed into substantially parallel beams or beams close to parallel beams by the collimating lenses 3Y and 3M (FIG. 1). Subsequently, the light beams LY and LM are formed into wide beams while passing through slits of the aperture plates 5Y and 5M. After that, the light beams LY and LM are finally focused in the sub-scanning direction and are finally condensed onto the beam deflector 9 while passing through the cylindrical lenses 7Y and 7M having a refractive power for the sub-scanning direction to refract the light beams LY and LM in the sub-scanning direction.

Therefore, a line-shaped light beam extended in the main scanning direction (parallel to the main scanning direction) is condensed on the deflective plane of the beam deflector 9.

Collimating lenses 3C and 3K, aperture plates 5C and 5K, and cylindrical lenses 7C and 7K may be sequentially arranged on an optical path between the light sources 1C and 1K and the beam deflector 9, and detailed descriptions thereof are substantially the same.

A light beam deflected by the beam deflector 9 is incident to an optical scanning lens 10, also called an f-θ lens. The optical scanning lens 10 includes a scanning lens 11a, and scanning lenses 13M and 13Y sequentially arranged on an optical path. The first scanning lens 11a disposed near the beam deflector 9 may be formed in common, or unitarily formed, with respect to the different light beams LY and LM that are separated in the sub-scanning direction. The second scanning lenses 13M and 13Y disposed near the photosensitive drums 15M and 15Y may be separately provided on the respective optical paths of the different light beams LY and LM. Scanning lens 11b, and scanning lenses 13C and 13K are sequentially arranged on the optical path, and are substantially similar to that of the first image forming optical system S1.

FIG. 1 illustrates the cross-sectional shape of the main-scanning lenses, and FIG. 2 illustrates the shape of the sub-scanning cross-section of the LSU. The main scanning lenses will be described in detail with reference to FIGS. 1 and 2. The first scanning lenses 11a and 11b each include an incident surface and an emitting surface formed in a predetermined shape to have a predetermined refractive power in the main-scanning direction and the sub-scanning direction, respectively. In detail, the main-scanning cross-section of the first scanning lenses 11a and 11b has a non-circular arc shape having an inflection point. Accordingly, the light beams LY, LM, LC, and LK that pass through the scanning lenses 11a and 11b are condensed onto the photosensitive drums 15Y, 15M 15C, and 15K at different refractive indexes depending on the incident positions thereof in the main-scanning direction (y axis direction). The shape of the first scanning lenses 11a and 11b are described below in more detail with reference to FIG. 1. The incident surface of the first scanning lenses 11a and 11b includes a concave surface of an indented shape at the center through which the lens' optical axis Lo passes, and includes a convex surface of a projected shape at both sides in the main-scanning direction (y axis direction). The emitting surface (y-axis direction) includes a convex surface of a projected shape at the center through which the lens' optical axis Lo passes, and includes a concave surface of an indented shape at both sides in the main-scanning direction (y axis direction). That is, the shape of the main-scanning cross-section may be a meniscus shape where the curvature signs of the incident surface and the emitting surface are substantially the same. Also, the incident surface and the emitting surface of the scanning lens may not form a perfect symmetry with respect to the lens's axis Lo but may be asymmetric.

Referring to FIG. 3, the first scanning lens 11a includes a non-circular shape in the sub-scanning direction. The incident surface of the first scanning lens 11a has a convex shape and the emitting surface of the first scanning lens 11a has a concave shape. Also, the sub-scanning cross-section of the incident surface and the emitting surface has a shape approaching a flat surface having a small refractive power at the center through which the lens's axis passes. The shape of the sub-scanning cross-section has a pattern continuously changing along the main-scanning direction. As illustrated in FIG. 3, according to the scanning lens 11a of an exemplary embodiment of the present invention, both the incident side and the emitting side of the scanning lens 11a may be designed using an aspherical surface. Alternatively, one of the incident side and the emitting side may be selectively designed using an aspherical surface. The lens' surface of the incident side and/or emitting side where the sub-scanning cross-section is an aspherical surface corrects a bow distortion of an oblique incidence optical system.

Figure 4:
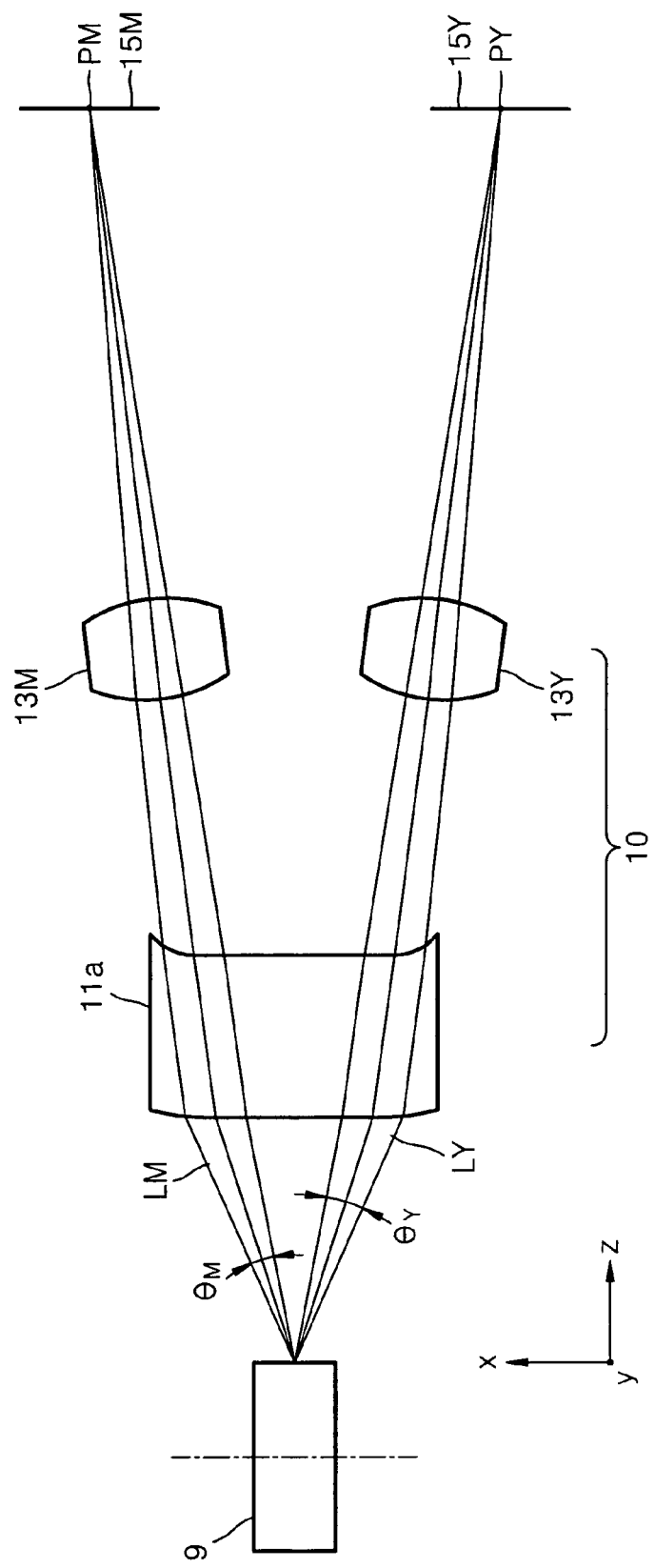
FIG. 4 is a view illustrating a sub-scanning cross-section of part of FIG. 3 according to an exemplary embodiment of the present invention.

FIG. 4 is an enlarged sectional view of part of FIG. 3 that explains the operation of the first scanning lens 11a. Referring to FIG. 4, the first scanning lens 11a is formed in common for the first light beam LM to be obliquely incident to an upper side thereof and the second light beam LY to be obliquely incident to a lower side thereof. The light beams LM and LY incident to the scanning lens 11a are condensed at a uniform height in the y-axis direction on the corresponding photosensitive drums 15M and 15Y, that is, on a scanning line of a predetermined height represented by PM and PY in FIG. 4, through a refraction operation of the aspherical surface of the first scanning unit 11a. Such convergence of the light beams LM and LY is achieved by correction of a bow distortion by the aspherical lens surface, which will be described below.

The light beams LM and LY emitted from the light sources 1M and 1Y are deflected by the rotating beam deflector 9 and are emitted in an angle distribution wide in the y-axis direction within the main-scanning cross-section, so that a scanning line is formed along the main-scanning direction on the photosensitive drums 15M and 15Y. At this point, when an oblique incidence optical system in which a light beam is incident in an oblique direction with respect to the beam deflector 9, the light beam has a predetermined emitting angle distribution also within the sub-scanning cross-section in the x-axis direction as the beam deflector 9 rotates ($\theta_M$ and $\theta_Y$). The incident position and the incident angle of the light beams LM and LY incident to the first scanning lens 11a change within the sub-scanning cross-section in the x-axis direction. The first scanning lens 11a in which a sub-scanning cross-section is designed in an aspherical surface provides different refractive powers depending on an incident position, so that the light beams LM and LY incident to different positions are condensed at a substantially uniform height and a bow distortion in which a scanning line is warped in a curved shape due to deviation in an image height along the scanning direction is removed.

A depth z of the first scanning lens 11a where a main-scanning cross-section and a sub-scanning cross-section have an aspherical shape is given by the equation below.

$$Z = \frac{\frac{y^2}{Rdy}}{1+\sqrt{1-\left(\frac{y}{Rdy}\right)^2}}_{(\text{term 1})} + \underbrace{\sum_{m=3}^{10} A_m Y^m}_{(\text{term 2})} +$$

$$\underbrace{\frac{x^2 c\left(1+\sum_{m=3}^{10} B_m Y^m\right)}{1+\sqrt{1-\left(1+k\left(1+\sum_{m=3}^{10} D_m Y^m\right)\right)\left(xc\left(1+\sum_{m=3}^{10} B_m Y^m\right)\right)^2}}}_{(\text{term 3})} + \underbrace{\sum_{m=3}^{10} C_m X^m}_{(\text{term 4})}$$

where, y and x are coordinates of a main scanning direction and a sub-scanning direction, respectively, and Z is the depth of the lens' surface with respect to an optical axis direction on the assumption that an intersection point of the first scanning lens 11a and an optical axis thereof is an origin of a coordinate system. Y and X are defined by $Y=\sqrt{y^2}$, $X=\sqrt{x^2}$. R is a curvature radius in a main-scanning direction. c is a curvature in a sub-scanning direction. Am, Bm, Cm, and Dm are coefficients selected for lens design. k is a conic constant. The respective parameters describing the shapes of the incident surface and emitting surface of the first scanning lens 11a may be determined according to a lens design, and in particular, the conic constant k may be optimized such that a bow distortion is corrected appropriately.

In the above equation, the first and second terms mainly describe the aspherical shape (non-circular arc shape) of the main scanning cross-section, and the third and fourth terms mainly describe the aspherical shape of the sub-scanning cross-section. The shape of the sub-scanning cross-section changes according to the coordinate y in the main-scanning direction and the scanning lens provides different refractive powers depending on the incident positions in the main scanning direction.

It is known from the above equation that the main scanning and sub-scanning cross-sections may be asymmetric with respect to the lens' optical axis (y=0). That is, as far as coefficients, which are odd numbers, not all are zero, the shape of the cross-section in the positive (+) region of the main scanning direction (y-axis direction) may not be identical to that in the negative (−) region. As the beam deflector 9 rotates, a beam-focusing position on which a light beam is condensed on the deflective surface of the beam deflector 9 and an incident angle formed by the deflective surface and the light beam continuously changes. Since such changes do not have a profile symmetric with respect to the lens' optical axis, the lens' shape needs to change asymmetrically with respect to the optical axis. The above equation exemplarily describes one embodiment of a scanning lens that may be adopted by the present invention. As far as the sub-scanning cross-section is described in an aspherical shape, there is no limitation.

Referring to FIGS. 1 and 3, the second scanning lenses 13Y, 13M, 13C, and 13K are arranged subsequently to the first scanning lenses 11a and 11b, and include an incident surface and an emitting surface having a predetermined refractive power. The incident surface and the emitting surface are designed in an aspherical shape continuously changing along the main scanning direction (y direction). The change of the shape in the main scanning direction (y direction) is more gentle than that of the first scanning lenses 11a and 11b, and the refractive power in the main-scanning direction (y direction) is mainly concentrated on the first scanning lenses 11a and 11b. The main-scanning cross-section of the second scanning lenses 13Y, 13M, 13C, and 13K may have a shape aspherical with respect to the lens's optical axis Lo.

Referring to FIG. 3, the second scanning lenses 13Y and 13M may be separately provided for the light beams LY and LM following different optical paths, respectively. A sub-scanning cross-section has a circular arc shape (spherical shape) convex to both directions. In more detail, the incident surface and the emitting surface of the second scanning lenses 13Y and 13M may be a spherical surface whose curvature radius continuously changes along the main-scanning direction (y direction). The profile of a sub-scanning curvature radius according to the main-scanning direction (y direction) may be determined by a lens' design.

Figure 5:
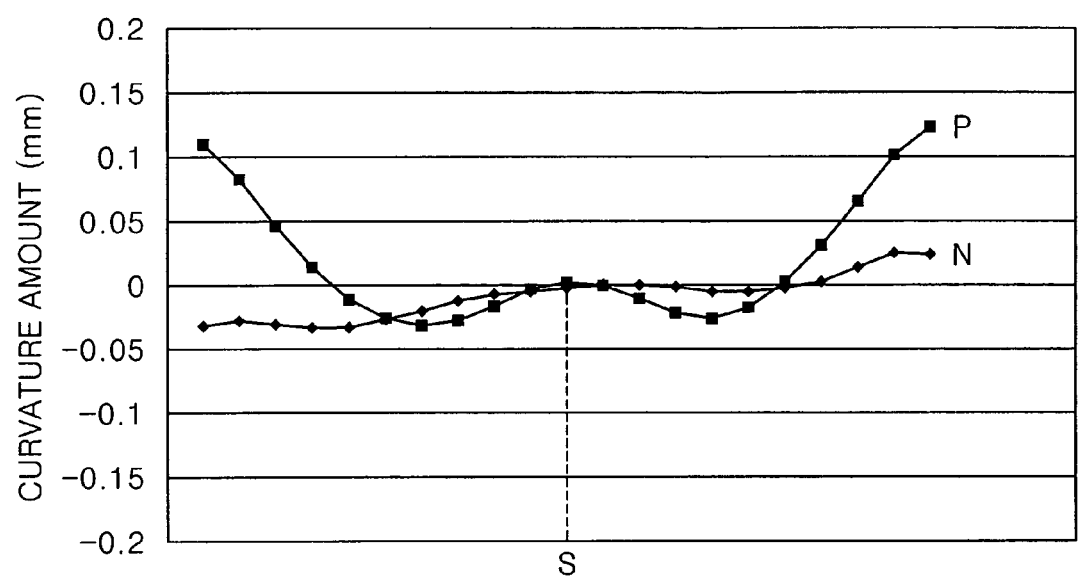
FIG. 5 is a view comparing curvature amounts according to an exemplary embodiment of the present invention and the prior art.

FIG. 5 is a view comparing curvature amounts according to an exemplary embodiment of the present invention and the prior art. In an experiment, a curvature amount (a profile N) of a scanning line in the tandem LSU according to an exemplary embodiment of the present invention and a curvature amount (a profile P) of a scanning line according to the prior art were measured. Here, the curvature amount is a value obtained by measuring an image height at respective positions in the main-scanning direction from an optical axis S. As is revealed from the measurement results, a bow distortion in which a scanning line is warped in a bow shape is generated according to the prior art (profile P). On the contrary, according to an exemplary embodiment of the present invention (profile N), such a bow distortion is considerably reduced and an almost straight scanning line is formed. Referring to FIG. 2, to direct the respective light beams scanned by the beam deflector 9 onto the corresponding photosensitive drums 15Y, 15M, 15C, and 15K, reflective mirrors 21Y, 21M, 21C, 21K, 23M, and 23C may be provided on the respective optical paths. The reflective mirrors 21Y, 21M, 21C, 21K, 23M, and 23C may be arranged to have a predetermined inclination angle with respect to the respective optical axis.

Figure 6:
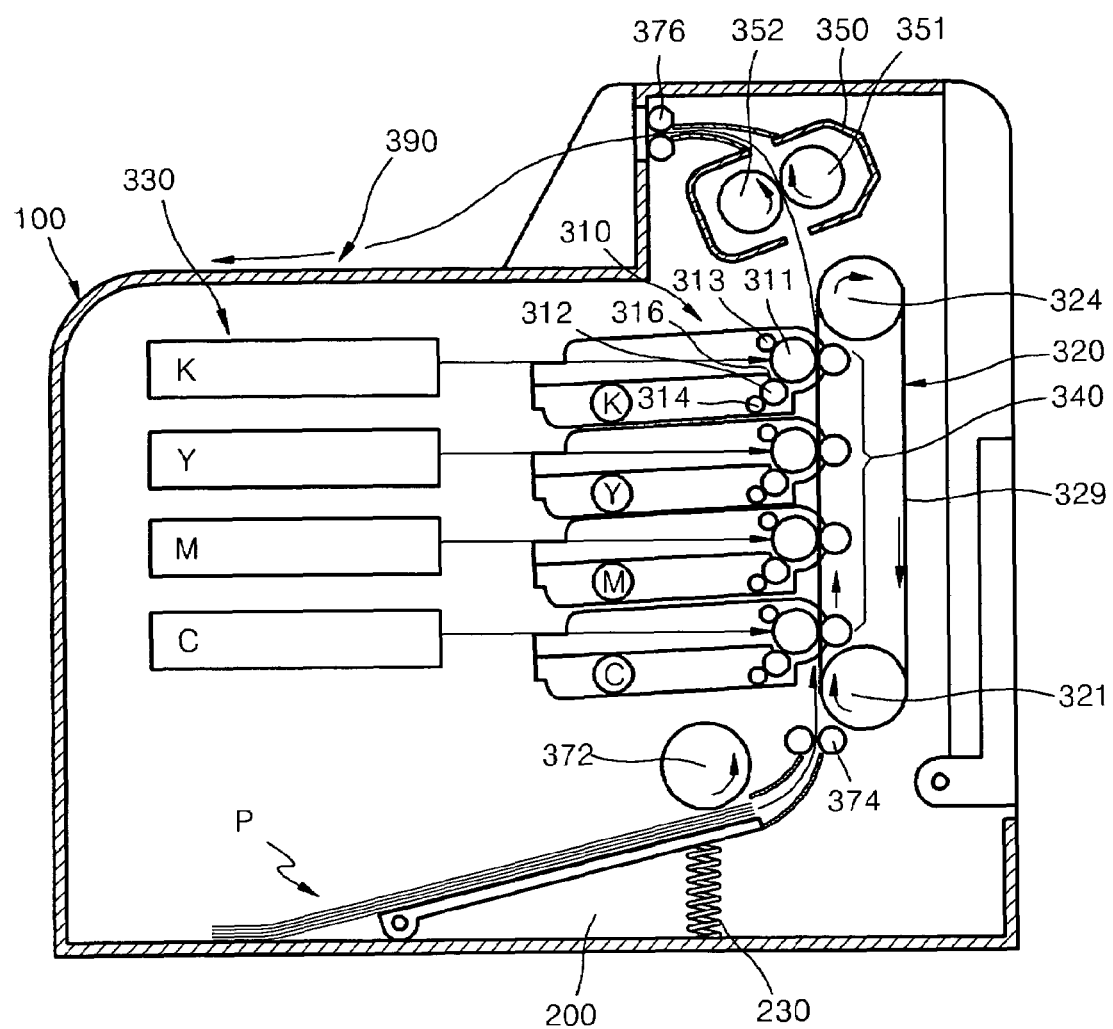
FIG. 6 is an elevational view in partial cross section of an image forming apparatus according to an exemplary embodiment of the present invention.

FIG. 6 illustrates a tandem type image forming apparatus 100 according to an exemplary embodiment of the present invention. Referring to FIG. 6, the tandem type image forming apparatus 100 includes a photosensitive body 311, an exposure unit 330, a developing unit 310, a fusing unit 350, and a transfer belt unit 320. The image forming apparatus 100 further includes a paper feeding cassette 200 combined with the image forming apparatus 100 to be detached therefrom or attached thereto, a knock-up plate on which a printable medium P is stacked and that is elastically supported by a knock-up spring 230, a pickup roller 372 that picks up the printable medium P stacked on the knock-up plate, and a feed roller 374 that feeds the picked-up printable medium P.

The image forming apparatus 100 is a tandem type image forming apparatus that includes four independent photosensitive bodies 311 according to colors and simultaneously performs a transfer operation on four different colors by feeding the printable medium P once. That is, while the printable medium P is transferred once, a complete color image is formed, similar to a monochrome image, so that a time required for color printing is identical to a time required for monochrome printing. Thus, the printing speed is very fast.

The color printable tandem type image forming apparatus 100 includes four developing units 310C, 310M, 310Y, and 310K in which toners having colors, such as cyan (C), magenta (M), yellow (Y), and black (K), respectively, are stored, and laser scanning units 330C, 330M, 330Y, and 330K.

Each of the developing units 310C, 310M, 310Y, and 310K includes the photosensitive body 311, a developing roller 312, a charging roller 313, a supplying roller 314, a regulating member 316, and a toner storing unit (not shown). A charging bias voltage is applied to the charging roller 313 to charge an outer circumference of the photosensitive body 311 with a uniform potential.

Each of the laser scanning units 330C, 330M, 330Y, and 330K forms an electrostatic latent image by irradiating light corresponding to image information of colors, such as cyan (C), magenta (M), yellow (Y), and black (K), onto the photosensitive body 311.

The supplying roller 314 supplies a developing agent stored in the toner storing unit to the developing roller 312. The developing roller 312 contains solid toner as a developing agent, supplies the toner to the electrostatic latent image formed on the photosensitive body 311 and develops the electrostatic latent image as a toner image. A developing bias voltage for supplying the toner to the photosensitive body 311 is applied to the developing roller 312. The regulating member 316, which regulates the amount of the toner attached to the developing roller 312, is installed outside the developing roller 312.

The photosensitive body 311 is installed so that a part of the outer surface is exposed, and is rotated in a predetermined direction. The outer surface exposed to the outer circumference of the photosensitive body 311 opposes a transfer belt 329.

The transfer belt unit 320 includes the transfer belt 329 that travels an endless track, and support rollers 321 and 324 that support both ends of the transfer belt 329 and travel the transfer belt 329. The four transfer rollers 340 are disposed inside the transfer belt 329. Each of the transfer rollers 340 opposes the photosensitive body 311 disposed in each of the developing units 310C, 310M, 310Y, and 310K when the transfer belt 329 is disposed between the transfer roller 340 and the photosensitive body 311. The transfer belt 329 feeds the printable medium P between an opposed surface between the photosensitive body 311 and the transfer roller 340. A transfer bias voltage is applied to the transfer roller 311, and the toner image is transferred onto the printable medium P by mechanical pressure and static electricity that act between the photosensitive body 311 and the transfer roller 340.

The fusing unit 350 includes a heating roller 351 and a pressurizing roller 352. The fusing unit 350 fuses the toner image on the printable medium P by applying heat and pressure to the toner image transferred onto the printable medium P. The heating roller 351 applies heat to the toner image, and the pressurizing roller 352 opposes the heating roller 351 and forms a fusing nip, thereby applying a high pressure to the printable medium P. The printable medium P that passes through the fusing unit 350 is delivered by a delivery roller 376 to a paper delivery board 390 disposed outside the image forming apparatus 100.

According to the tandem LSU of exemplary embodiments of the present invention, different light beams are obliquely incident, so that manufacturing costs may be reduced and driving efficiency of the beam deflector may be improved. Moreover, the shape of the optical scanning lens is designed in an aspherical surface, so that curvature of the scanning line caused by obliquely incident light is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A tandem light scanning unit (LSU) forming a substantially straight scanning line by scanning different light beams in a main scanning direction on different photosensitive drums, the tandem LSU comprising:
    a light source;
    a beam deflector rotating on a light-emitting path of a light source and substantially simultaneously deflecting different light beams obliquely incident at a predetermined angle to each other within a sub-scanning plane substantially parallel to a rotational axis of the beam deflector; and
    an optical scanning lens allowing the light beams deflected by the beam deflector to be formed on corresponding photosensitive drums, wherein the optical scanning lens includes at least one sub-scanning cross-section having an aspherical surface in a sub-scanning direction to reduce a curvature of the scanning line,
    wherein the aspherical surface has a shape defined by:

$$Z = \frac{\frac{y^2}{Rdy}}{1 + \sqrt{1 - \left(\frac{y}{Rdy}\right)^2}} + \sum_{m=3}^{10} A_m Y^m + \frac{x^2 c \left(1 + \sum_{m=3}^{10} B_m Y^m\right)}{1 + \sqrt{1 - \left(1 + k\left(1 + \sum_{m=3}^{10} D_m Y^m\right)\right)\left(xc\left(1 + \sum_{m=3}^{10} B_m Y^m\right)\right)^2}} + \sum_{m=3}^{10} C_m X^m$$

where, y and x are coordinates of a main-scanning direction and a sub-scanning direction, respectively, and Z is a depth of the optical lens' surface with respect to an optical axis direction on the assumption that an intersection point of the optical scanning lens and an optical axis thereof is an origin of a coordinate system; Y and X are defined by $Y=\sqrt{y^2}$, $X=\sqrt{x^2}$; R is a curvature radius in the main scanning direction; c is a curvature in a sub-scanning direction; Am, Bm, Cm, and Dm are coefficients selected for lens design; and k is a conic constant.

2. The tandem LSU of claim 1, wherein the aspherical shape of the optical scanning lens changes in the main scanning direction.

3. The tandem LSU of claim 2, wherein the aspherical shape of the optical scanning lens continuously changes in the main scanning direction.

4. The tandem LSU of claim 1, wherein the aspherical shape of the optical scanning lens is asymmetric with respect to the optical axis of the optical scanning lens in the main scanning direction.

5. The tandem LSU of claim 1, wherein the optical scanning lens includes a first scanning lens disposed proximal the beam deflector; and a second scanning lens disposed proximal the photosensitive drum.

6. The tandem LSU of claim 5, wherein at least one surface of a light-incidence surface and a light-emitting surface of the first scanning lens has an aspherical sub-scanning cross-section.

7. The tandem LSU of claim 6, wherein the first scanning lens is unitarily formed for light beams divided into different optical paths within the sub-scanning plane; and the second scanning lens is separately formed for each optical path.

8. A tandem light scanning unit (LSU) having a first optical system and a second optical system each scanning different light beams on different photosensitive drums, the tandem LSU comprising:
- a rotatable beam deflector shared by the first and second optical systems and having a first side thereof facing the first optical system and a second side thereof facing the second optical system, and to which light beams of the first and second optical systems are obliquely incident at a predetermined angle to each other within a sub-scanning plane substantially parallel to a rotational axis of the beam deflector; and
- each of the first and second optical systems having a first optical scanning lens and a second optical scanning lens allowing light beams deflected by the beam deflector to be condensed on corresponding photosensitive drums, each optical scanning lens having at least one sub-scanning cross-section having an aspherical surface in a sub-scanning direction to reduce a curvature of a scanning line,
- wherein the optical scanning lens has an aspherical shape defined by:

$$Z = \frac{\frac{y^2}{Rdy}}{1 + \sqrt{1 - \left(\frac{y}{Rdy}\right)^2}} + \sum_{m=3}^{10} A_m Y^m + \frac{x^2 c \left(1 + \sum_{m=3}^{10} B_m Y^m\right)}{1 + \sqrt{1 - \left(1 + k\left(1 + \sum_{m=3}^{10} D_m Y^m\right)\right)\left(xc\left(1 + \sum_{m=3}^{10} B_m Y^m\right)\right)^2}} + \sum_{m=3}^{10} C_m X^m$$

where, y and x are coordinates of a main scanning direction and a sub-scanning direction, respectively, and Z is a depth of the optical lens' surface with respect to an optical axis direction on the assumption that an intersection point of the optical scanning lens and an optical axis thereof is an origin of a coordinate system; Y and X are defined by $Y=\sqrt{y^2}$, $X=\sqrt{x^2}$; R is a curvature radius in a main-scanning direction; c is a curvature in a sub-scanning direction; Am, Bm, Cm, and Dm are coefficients selected for lens design; and k is a conic constant.

9. The tandem LSU of claim 8, wherein the aspherical shape of the optical scanning lens changes in the main scanning direction.

10. The tandem LSU of claim 9, wherein the aspherical shape of the optical scanning lens continuously changes in the main scanning direction.

11. The tandem LSU of claim 8, wherein the aspherical shape of the optical scanning lens is asymmetric with respect to the optical axis of the optical scanning lens in the main scanning direction.

12. The tandem LSU of claim 8, wherein the first scanning lens is disposed proximal the beam deflector; and the second scanning lens is disposed proximal the photosensitive drum.

13. The tandem LSU of claim 12, wherein at least one surface of a light-incidence surface and a light-emitting surface of the first scanning lens has an aspherical sub-scanning cross-section.

14. The tandem LSU of claim 12, wherein the first scanning lens is unitarily formed for light beams divided into different optical paths within the sub-scanning plane; and the second scanning lens is separately formed for each optical path.

15. The tandem LSU of claim 8, wherein each of the first and second optical systems has a pair of light sources that emit light beams that converge as the light beams approach the beam deflector.

16. The tandem LSU of claim 8, wherein each of the first and second optical systems has first and second light sources, each of the light sources being adapted to scan a light beam onto a different photosensitive drum.

17. The tandem LSU of claim 16, wherein each of the light sources has a different first scanning lens.

18. The tandem LSU of claim 15, wherein each pair of light sources has a different scanning lens.

19. An image forming apparatus, comprising:
- a plurality of photosensitive drums;
- a tandem light scanning unit (LSU) forming a substantially straight scanning line by scanning different light beams in a main scanning direction on different photosensitive drums of the plurality of photosensitive drums, the tandem LSU comprising:
  - a light source;
  - a beam deflector rotating on a light-emitting path of a light source and substantially simultaneously deflecting different light beams obliquely incident at a predetermined angle to each other within a sub-scanning plane substantially parallel to a rotational axis of the beam deflector; and
  - an optical scanning lens allowing the light beams deflected by the beam deflector to be formed on corresponding photosensitive drums, wherein the optical scanning lens includes at least one sub-scanning cross-section having an aspherical surface in a sub-scanning direction to reduce a curvature of the scanning line,
  - wherein the aspherical surface has a shape defined by:

$$Z = \frac{\frac{y^2}{Rdy}}{1 + \sqrt{1 - \left(\frac{y}{Rdy}\right)^2}} + \sum_{m=3}^{10} A_m Y^m + \frac{x^2 c \left(1 + \sum_{m=3}^{10} B_m Y^m\right)}{1 + \sqrt{1 - \left(1 + k\left(1 + \sum_{m=3}^{10} D_m Y^m\right)\right)\left(xc\left(1 + \sum_{m=3}^{10} B_m Y^m\right)\right)^2}} + \sum_{m=3}^{10} C_m X^m$$

where, y and x are coordinates of a main-scanning direction and a sub-scanning direction, respectively, and Z is a depth of the optical lens' surface with respect to an optical axis direction on the assumption that an intersection point of the optical scanning lens and an optical axis thereof is an origin of a coordinate system; Y and X are defined by $Y=\sqrt{y^2}$, $X=\sqrt{x^2}$; R is a curvature radius in the main scanning direction; c is a curvature in a sub-scanning direction; Am, Bm, Cm, and Dm are coefficients selected for lens design; and k is a conic constant.

20. An image forming apparatus according to claim 19, wherein the aspherical shape of the optical scanning lens changes in the main scanning direction.

21. An image forming apparatus according to claim 20, wherein the aspherical shape of the optical scanning lens continuously changes in the main scanning direction.

22. An image forming apparatus according to claim 19, wherein the aspherical shape of the optical scanning lens is asymmetric with respect to the optical axis of the optical scanning lens in the main scanning direction.

23. An image forming apparatus according to claim 19, wherein the optical scanning lens includes a first scanning lens disposed proximal the beam deflector; and a second scanning lens disposed proximal the photosensitive drum.

24. An image forming apparatus according to claim 23, wherein at least one surface of a light-incidence surface and a light-emitting surface of the first scanning lens has an aspherical sub-scanning cross-section.

25. An image forming apparatus according to claim 24, wherein the first scanning lens is unitarily formed for light beams divided into different optical paths within the sub-scanning plane; and the second scanning lens is separately formed for each optical path.

* * * * *